United States Patent
Cheng et al.

(10) Patent No.: US 9,825,750 B2
(45) Date of Patent: Nov. 21, 2017

(54) METHOD AND APPARATUS FOR INDICATING AN ATTRIBUTE OF A DYNAMIC SUBFRAME

(71) Applicant: Huawei Technologies Co., Ltd., Shenzhen, Guangdong (CN)

(72) Inventors: Yan Cheng, Shenzhen (CN); Yongxia Lv, Shenzhen (CN); Lei Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 185 days.

(21) Appl. No.: 13/973,691

(22) Filed: Aug. 22, 2013

(65) Prior Publication Data
US 2014/0010127 A1  Jan. 9, 2014

Related U.S. Application Data

(63) Continuation of application No. PCT/CN2012/071440, filed on Feb. 22, 2012.

(30) Foreign Application Priority Data

Feb. 23, 2011 (CN) .......................... 2011 1 0044049

(51) Int. Cl.
*H04J 3/00* (2006.01)
*H04L 5/14* (2006.01)
*H04W 72/12* (2009.01)
*H04B 7/26* (2006.01)

(52) U.S. Cl.
CPC ............ *H04L 5/14* (2013.01); *H04B 7/2656* (2013.01); *H04W 72/1205* (2013.01); *H04B 7/2643* (2013.01)

(58) Field of Classification Search
CPC ........................................................ H04L 5/14
USPC ........................................................ 370/280
See application file for complete search history.

(56) References Cited

U.S. PATENT DOCUMENTS

| | | | | |
|---|---|---|---|---|
| 9,525,537 | B2 * | 12/2016 | Sun | H04L 5/0094 |
| 9,554,336 | B2 * | 1/2017 | Ouchi | H04W 52/146 |
| 2009/0249153 | A1 * | 10/2009 | Zhang | H04L 1/1887 |
| | | | | 714/748 |

(Continued)

FOREIGN PATENT DOCUMENTS

| | | |
|---|---|---|
| CN | 101498282 A | 8/2009 |
| CN | 101651895 A | 2/2010 |

(Continued)

OTHER PUBLICATIONS

International Search Report in corresponding PCT Patent Application No. PCT/CN2012/071440 (dated May 24, 2012).

*Primary Examiner* — Guang Li
(74) *Attorney, Agent, or Firm* — Leydig, Voit & Mayer, Ltd.

(57) ABSTRACT

Indicating a attribute of a dynamic subframe in the scenario of applying the dynamic TDD subframe in a time division duplexing system includes: determining, by a user equipment, an attribute of a dynamic subframe, wherein the attribute of the dynamic subframe indicates that the dynamic subframe is an uplink subframe or that the dynamic subframe is a downlink subframe; and performing an information transmission according to the attribute of the dynamic subframe.

14 Claims, 4 Drawing Sheets

--- a user equipment determines an attribute of a dynamic subframe, wherein the attribute of the dynamic subframe indicates that the dynamic subframe is an uplink subframe or that the dynamical subframe is a downlink subframe — 201 an information transmission is performed according to the attribute of the dynamic subframe — 202

(56) References Cited

U.S. PATENT DOCUMENTS

| | | | | |
|---|---|---|---|---|
| 2009/0312008 A1* | 12/2009 | Lindoff | ................ | H04L 25/022 455/423 |
| 2011/0085513 A1* | 4/2011 | Chen | ................ | H04W 72/042 370/330 |
| 2011/0149813 A1* | 6/2011 | Parkvall | ............... | H04B 7/2656 370/280 |
| 2011/0176461 A1* | 7/2011 | Astely | ................. | H04B 7/2656 370/280 |
| 2011/0211503 A1* | 9/2011 | Che | ..................... | H04L 5/0005 370/280 |
| 2012/0120854 A1* | 5/2012 | Zhang et al. | ................ | 370/280 |
| 2012/0207083 A1* | 8/2012 | Chen | .................... | H04W 72/04 370/315 |
| 2012/0230232 A1* | 9/2012 | Ji | ....................... | H04B 7/2656 370/280 |
| 2012/0230273 A1* | 9/2012 | He | ....................... | H04L 1/1887 370/329 |
| 2012/0263057 A1* | 10/2012 | Choi | ...................... | H04W 28/048 370/252 |
| 2013/0322343 A1* | 12/2013 | Seo | ....................... | H04W 24/02 370/328 |

FOREIGN PATENT DOCUMENTS

| | | |
|---|---|---|
| CN | 101926214 A | 12/2010 |
| WO | WO 2004032372 A1 | 4/2004 |
| WO | WO 2010006903 A1 | 1/2010 |
| WO | WO 2010049587 A1 | 5/2010 |
| WO | WO 2011077288 A2 | 6/2011 |

* cited by examiner

METHOD AND APPARATUS FOR INDICATING AN ATTRIBUTE OF A DYNAMIC SUBFRAME

CROSS-REFERENCE TO RELATED APPLICATIONS

This application is a continuation of International Patent Application No. PCT/CN2012/071440, filed on Feb. 22, 2012, which claims priority to Chinese Patent Application No. 201110044049.3, filed on Feb. 23, 2011, both of which are hereby incorporated by reference in their entireties.

FIELD

The present disclosure relates to the field of communications, and more particularly, to a method and an apparatus for information transmission in a time division duplexing system.

BACKGROUND

In a TDD (Time Division Duplexing) system, information is sent and received by using different time slots of a same frequency carrier. With regard to a frame structure of the TDD system, FIG. 1 may be referred to, in which each radio frame has a frame length of 10 ms and includes ten subframes each of which has a length of 1 ms, and each half radio frame has a frame length of 5 ms.

In the TDD system, an uplink-downlink configuration may be semi-statically adjusted according to different types of services, so as to meet a service requirement of asymmetrical uplink-downlink. In a 3GPP (3rd Generation Partnership Project) LTE (Long Term Evolution) TDD system, as shown in Table 1, there are seven kinds of uplink-downlink configurations in total, where 'D' represents a downlink subframe, 'U' represents an uplink subframe and 'S' represents a special subframe. Since the special subframe includes a DwPTS, the special subframe can be used for downlink

TABLE 1

Uplink-downlink configurations in a TDD system

| uplink-downlink configuration serial number | repeat period | subframe serial number in a radio frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In a LTE system, which uplink-downlink configuration to be used is configured semi-statically by a base station, so it will occur that a configured uplink-downlink configuration does not match an instantaneous service type, and thus resources cannot be used efficiently, which is especially serious in a cell with a relatively small number of users. In order to solve this problem, a technology of applying a dynamic TDD subframe may be introduced to the LTE R11 Version, namely that several dynamic subframes, which are able to not only be used as uplink subframes but also be used as downlink subframes, are configured in a radio frame.

Table 2 illustrates a schematic diagram of applying a dynamic TDD subframe in a radio frame, that is, the last two subframes of each half radio frame are dynamic subframes, wherein 'F' represents a dynamic subframe. In addition, subframes with subframe numbers 0, 1, 5 and 6 in a radio frame are all used for downlink, namely downlink subframes, and these four subframes may also be referred to as fixed downlink subframes. Subframes with subframe numbers 2 and 7 in a radio frame are both uplink subframes, and these two subframes may also be referred to as fixed uplink subframes.

TABLE 2

| Subframe number in a radio frame | | | | | | | | | |
|---|---|---|---|---|---|---|---|---|---|
| 0 | 1 | 2 | 3 | 4 | 5 | 6 | 7 | 8 | 9 |
| D | S | U | F | F | D | S | U | F | F |

However, in a scenario of applying the dynamic TDD subframe, the related art does not solve a problem how to determine whether a dynamic subframe is an uplink subframe or a downlink subframe, thus an information transmission in the scenario of applying the dynamic TDD subframe can not be implemented.

SUMMARY

The embodiments of the present disclosure provide a method and an apparatus for information transmission, so as to solve a problem how to transmit information in a scenario of applying a dynamic TDD subframe.

In order to solve the above-mentioned problem, the embodiments of the present disclosure adopt the following technical solutions.

A method for information transmission, including:
determining, by a user equipment, an attribute of a dynamic subframe, wherein the attribute of the dynamic subframe indicates that the dynamic subframe is an uplink subframe or that the dynamic subframe is a downlink subframe; and
performing an information transmission according to the attribute of the dynamic subframe.

A method for information transmission, including:
sending a signaling for indicating an attribute of a dynamic subframe corresponding to downlink subframe n to a user equipment at the downlink subframe n, wherein n is a subframe serial number in a radio frame, and the attribute of the dynamic subframe indicates that the dynamic subframe is an uplink subframe or that the dynamic subframe is a downlink subframe; and
performing an information transmission according to the attribute of the dynamic subframe.

An apparatus for information transmission in a Time Division Duplexing system, including:
a determining unit, configured to determine an attribute of a dynamic subframe, wherein the attribute of the dynamic subframe indicates that the dynamic subframe is an uplink subframe or that the dynamic subframe is a downlink subframe; and
a transmitting unit, configured to perform an information transmission according to the attribute of the dynamic subframe.

An apparatus for information transmission in a time division duplexing system, including:

a sending unit, configured to send a signaling for indicating an attribute of a dynamic subframe corresponding to downlink subframe n to a user equipment in the downlink subframe n, wherein n is a subframe serial number in a radio frame and the attribute of the dynamic subframe indicates that the dynamic subframe is an uplink subframe or that the dynamic subframe is a downlink subframe; and a transmitting unit, configured to perform an information transmission according to the attribute of the dynamic subframe.

In the method and apparatus for information transmission provided by the embodiments of the present disclosure, an attribute of a dynamic subframe, specifically that the dynamic subframe is an uplink subframe or a downlink subframe, is determined by a user equipment, and an information transmission is performed according to the attribute of the dynamic subframe, thereby implementing the information transmission in the scenario of applying the dynamic TDD subframe.

BRIEF DESCRIPTION

To illustrate the technical solution in the embodiments of the present disclosure or the prior art more clearly, a brief introduction on the accompanying drawings which are needed in the description of the embodiments or the prior art is given below. Apparently, the accompanying drawings in the description below are merely some of the embodiments of the present disclosure, based on which other drawings can be acquired by the persons of ordinary skill in the art without any inventive effort.

DETAILED DESCRIPTION

The technical solutions in the embodiments of the present disclosure will be described clearly and completely hereinafter with reference to the accompanying drawings in the embodiments of the present disclosure. Evidently, the described embodiments are merely part, but not all, of the embodiments of the present disclosure. All other embodiments, which can be derived by the persons of ordinary skills in the art based on the embodiments of the present disclosure without any inventive efforts, shall fall into the protection scope of the present disclosure.

In all embodiments of the present disclosure, a dynamic subframe refers to a subframe which may be an uplink subframe or a downlink subframe in a radio frame. The dynamic subframe being an uplink subframe means that the dynamic subframe is used as an uplink subframe, and in such case, the dynamic subframe may also be referred to as a dynamic uplink subframe. The dynamic subframe being a downlink subframe means that the dynamic subframe is used as a downlink subframe, and in such case, the dynamic subframe may also be referred to as a dynamic downlink subframe. In a scenario of applying a dynamic subframe, a base station will configure some subframe(s) in each radio frame of N radio frame(s) as dynamic subframe(s), and other subframe(s) as fixed subframe(s), wherein N is a natural number larger than or equal to 1. The fixed subframe is either fixed as an uplink subframe, referred to as a fixed uplink subframe or simply an uplink subframe, or fixed as a downlink subframe, referred to as a fixed downlink uplink subframe or simply a downlink subframe.

Figure 1:
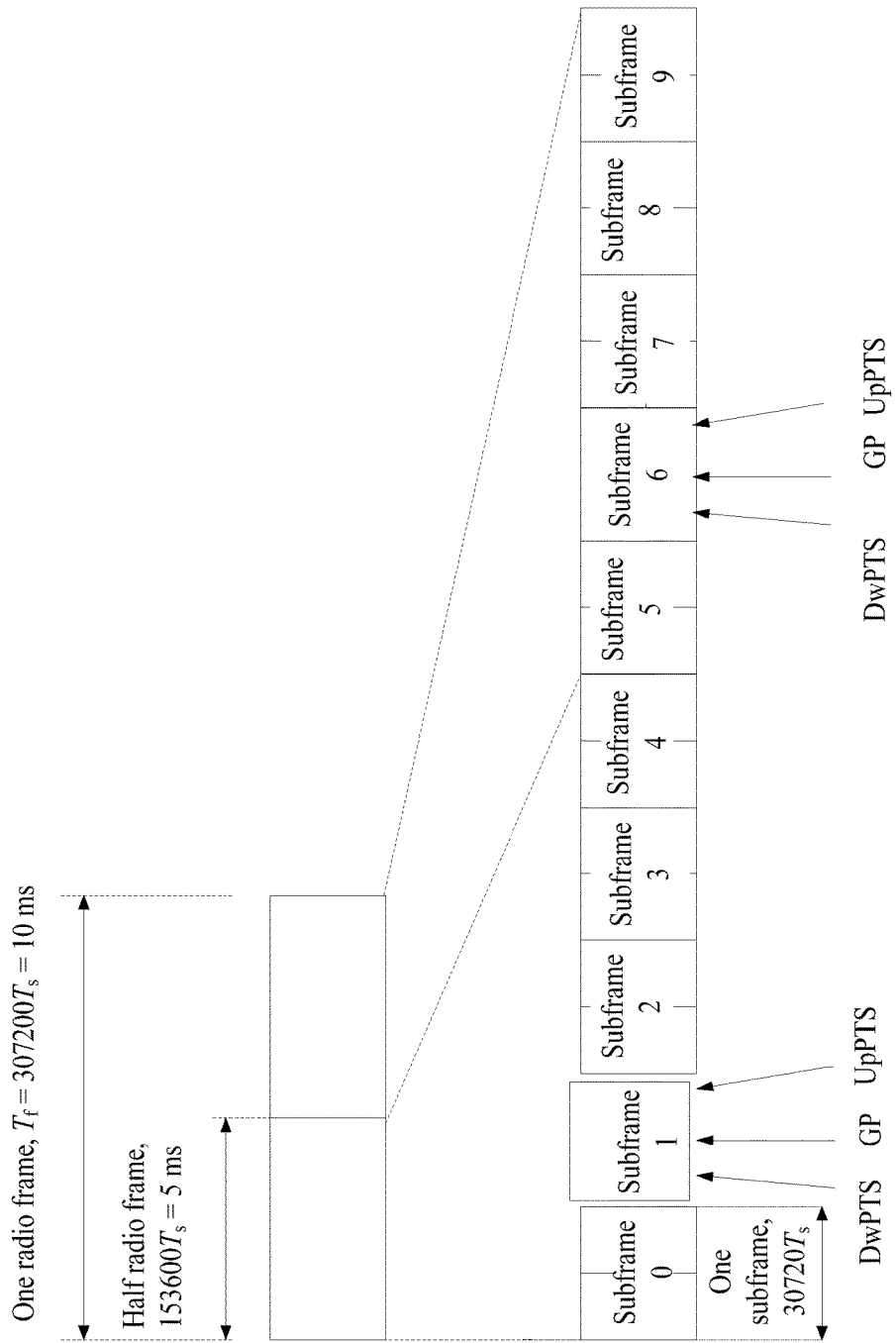
FIG. 1 is a schematic diagram of a frame structure of a radio frame.

With respect to a radio frame structure in FIG. 1, each radio frame has a frame length of 10 ms and includes 10 subframes each of which is 1 ms. Generally, the 10 subframes of a radio frame are labeled as subframes 0~9 in chronological order, wherein the 0~9 are subframe numbers in a radio frame. For example, subframe 0 in a radio frame refers to the first subframe in the radio frame, subframe 5 in a radio frame refers to the sixth subframe in the radio frame, subframe 1 in a radio frame refers to the second subframe in the radio frame, and subframe 6 in a radio frame refers to the seventh subframe in the radio frame.

In addition, usually, during a process of a communication between a base station and a user terminal, it is necessary to use multiple radio frames to transmit information. In all embodiments of the present disclosure, each subframe has a serial number in multiple radio frames. The serial number may be referred to as a subframe serial number, or a subframe serial number in a radio frame. The serial number may be acquired in the following manner. Subframes in multiple radio frames are numbered from 0 in a monotonically incremental manner in chronological order, that is, if a serial number of the last subframe of a previous radio frame is n', a serial number of the first subframe of a next radio frame is n'+1. Meanwhile, each subframe also has a subframe number in a radio frame to which the subframe belongs, i.e., a subframe number of the subframe in a radio frame. Therefore, in the embodiments of the present disclosure, when downlink subframe n is referred to as subframe i in a radio frame, it is indicated that a downlink subframe with subframe serial number n in N radio frame(s) is the (i+1)th subframe in a radio frame to which the downlink subframe belongs. For example, when the downlink subframe n is subframe 0 in a radio frame, it is indicated that a downlink subframe with subframe serial number n in N radio frame(s) is the first subframe in a radio frame to which the downlink subframe belongs, where N is a natural number larger than or equal to 1.

The methods provided by the respective embodiments of the present disclosure hereinafter are applicable to a scenario of applying a dynamic TDD subframe, and a schematic diagram of applying the dynamic TDD subframe may be referred to Table 2, i.e., a condition of applying a dynamic subframe in each radio frame of N radio frame(s) in the scenario is as shown in Table 2. In this scenario, subframe 0, subframe 1, subframe 5 and subframe 6 in each radio frame of the N radio frame(s) are downlink subframes, and these four subframes may also be referred to as fixed downlink subframes. Subframe 2 and subframe 7 in each radio frame of the N radio frame(s) are uplink subframes, and these two subframes may also be referred to as fixed uplink subframes. Subframe 3, subframe 4, subframe 8 and subframe 9 in each radio frame of the N radio frame(s) are dynamic subframes.

Figure 2:
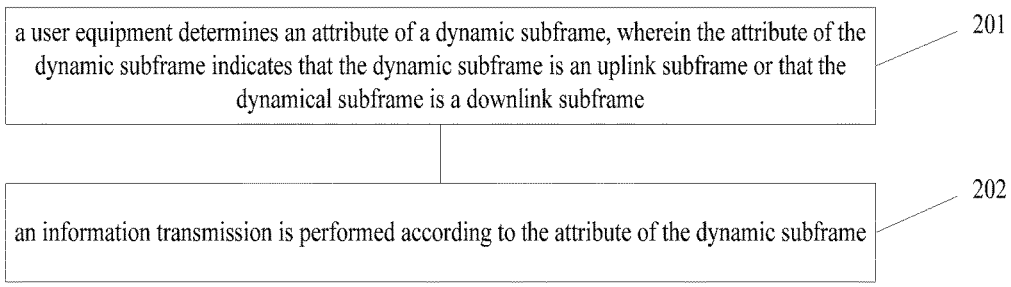
FIG. 2 is a flowchart of a method for information transmission provided by an embodiment of the present disclosure.

In order to solve the problem how to transmit information in a scenario of applying a dynamic TDD subframe, an embodiment of the present disclosure provides a method for information transmission. As shown in FIG. 2, the method includes the following steps.

Step 201, a user equipment determines an attribute of a dynamic subframe, wherein the attribute of the dynamic subframe refers to that the dynamic subframe is an uplink subframe or that the dynamical subframe is a downlink subframe.

The user equipment may determine the attribute of the dynamic subframe by at least one of the following three manners.

In a first manner, the user equipment detects a signaling sent from a base station, and determines an attribute of a corresponding dynamic subframe according to the signaling sent from the base station. In this manner, the signaling sent from the base station may notify the user equipment in a dynamic manner, a semi-persistent scheduling (SPS) manner or other manners.

The signaling sent from the base station may include an uplink indication field, and the uplink indication field may have the following uses. It may be used for indicating the attribute of the dynamic subframe, or used for indicating whether an information transmission in a fixed uplink subframe or in a dynamic uplink subframe is indicated by the signaling sent from the base station, or used for indicating the attribute of the dynamic subframe and indicating whether the signaling sent from the base station indicates an information transmission in a fixed uplink subframe or in a dynamic uplink subframe.

The signaling sent from the base station may be an assignment indication (grant), and the assignment indication may be a physical downlink control channel signaling carrying downlink control information format 0 or carrying downlink control information format 4.

The signaling sent from the base station is the signaling detected by the user equipment.

The uplink indication field may correspond to a downlink assignment index (DAI) field in downlink control information format 0 or in downlink control information format 4. Or, the uplink indication field may correspond to an uplink index (UL index) field in downlink control information format 0 or in downlink control information format 4, or be a newly added field in downlink control information format 0 or in downlink control information format 4. The uplink indication field may be a field of 1 bit or 2 bits. If the uplink indication field is a field of 2 bits, the uplink indication field is divided into the most significant bit (MSB) and the least significant bit (LSB). For example, if a field of 2 bits is denoted by AB, then A is the most significant bit, and the B is the least significant bit. For another example, if a field of 2 bits is denoted by 01, then the most significant bit of the field is 0, i.e., a value of the most significant bit of the field is 0, and the least significant bit of the field is 1, i.e., a value of the least significant bit of the field is 1.

It is to be noted that the above-mentioned description may be used to explain a signaling sent from a base station (i.e., a signaling detected by a user equipment) and an uplink indication field in all embodiments of the present disclosure.

In a second manner, the user equipment detects, in downlink subframe n, a signaling sent from a base station, where n is a subframe serial number in a radio frame; and determines, according to the signaling detected in the downlink subframe n, an attribute of a dynamic subframe corresponding to the downlink subframe n.

In this manner, the signaling sent from the base station may notify the user equipment in a dynamic manner or in a manner similar to a semi-persistent scheduling.

One specific method for the signaling sent from the base station to notify the user equipment is that, the signaling, sent from the base station to the user equipment in the downlink subframe n, i.e., in subframe 0 or subframe 5 in a radio frame, is used for indicating an attribute of dynamic subframe n+4 corresponding to the downlink subframe n; and the signaling sent from the base station to the user equipment in the downlink subframe n, i.e., in subframe 1 or subframe 6 in a radio frame, is used for indicating an attribute of dynamic subframe n+7 corresponding to the downlink subframe n.

The determining, according to the signaling detected in the downlink subframe n, the attribute of the dynamic subframe corresponding to the downlink subframe n may be determining that dynamic subframe n+4 is an uplink subframe, when the downlink subframe n is subframe 0 or subframe 5 in a radio frame and the most significant bit of the uplink indication field in the signaling sent from the base station is 1; and determining that dynamic subframe n+7 is an uplink subframe, when the downlink subframe n is subframe 1 or subframe 6 in a radio frame and the least significant bit of the uplink indication field in the signaling sent from the base station is 1. Alternatively, the determining, according to the signaling detected in the downlink subframe n, the attribute of the dynamic subframe corresponding to the downlink subframe n is determining that dynamic subframe n+4 is an uplink subframe, when the downlink subframe n is subframe 0 or subframe 5 in a radio frame and the most significant bit of the uplink indication field in the signaling sent from the base station is 1; and determining that dynamic subframe n+8 is an uplink subframe, when the downlink subframe n is subframe 0 or subframe 5 in a radio frame and the least significant bit of the uplink indication field in the signaling sent from the base station is 1.

In a third manner, if the user equipment does not receive any signaling sent from the base station for indicating the attribute of the dynamic subframe, the dynamic subframe is a downlink subframe.

Step 202, an information transmission is performed according to the attribute of the dynamic subframe.

If step 201 is performed in the second manner, the performing the information transmission according to the attribute of the dynamic subframe in the present step may be that, the user equipment performs a physical uplink shared channel (PUSCH) transmission in the dynamic subframe n+4, when the downlink subframe n is subframe 0 or subframe 5 in a radio frame and the most significant bit of the uplink indication field in the signaling sent from the base station is 1; and the user equipment performs the PUSCH transmission in the dynamic subframe n+7, when the downlink subframe n is subframe 1 or subframe 6 in a radio frame and the least significant bit of the uplink indication field in the signaling sent from the base station is 1.

In addition, since the uplink indication field may be further used for indicating an information transmission in a fixed uplink subframe, the present method may further include:

Step 203, the user equipment performs a PUSCH transmission in uplink subframe n+7, when the downlink subframe n is subframe 0 or subframe 5 in a radio frame and the least significant bit of the uplink indication field in the signaling sent from the base station is 1; or, the user equipment performs a PUSCH transmission in uplink subframe n+6, when the downlink subframe n is subframe 1 or subframe 6 in a radio frame and the most significant bit of the uplink indication field in the signaling sent from the base station is 1.

Step 202 completes an information transmission in a dynamic subframe and step 203 completes an information transmission in a fixed uplink subframe. There is no limitation on the executing order of these two steps and these two steps complete an information transmission in the scenario of applying the dynamic TDD subframe together. Further, the two steps perform the information transmission both according to a predetermined timing relationship, which may specifically be performing a PUSCH transmission according to a predetermined timing relationship, wherein the predetermined timing relationship is a timing relationship of a PUSCH in a LTE TDD R8 system with uplink-downlink configuration 0, i.e., a timing relationship between downlink control information (DCI) format 0 and its corresponding PUSCH transmission in the LTE TDD R8 system with uplink-downlink configuration 0; or specifically be detecting a physical hybrid ARQ indicator channel (PHICH) according to a predetermined timing relationship, wherein the predetermined timing relationship is a timing relationship of a physical hybrid automatic repeat request indicator channel in a LTE TDD R8 system with uplink-downlink configuration 0, and the timing relationship of the physical hybrid automatic repeat request indicator channel is a timing relationship between a PUSCH transmission and a PHICH transmission in the LTE TDD R8 system with uplink-downlink configuration 0.

In addition, when step 201 is performed in the first manner or in the third manner, steps 202 and 203 may also perform the information transmission according to the predetermined timing relationship mentioned above, and explanations on the predetermined timing relationship may refer to the above-mentioned description.

Figure 3:
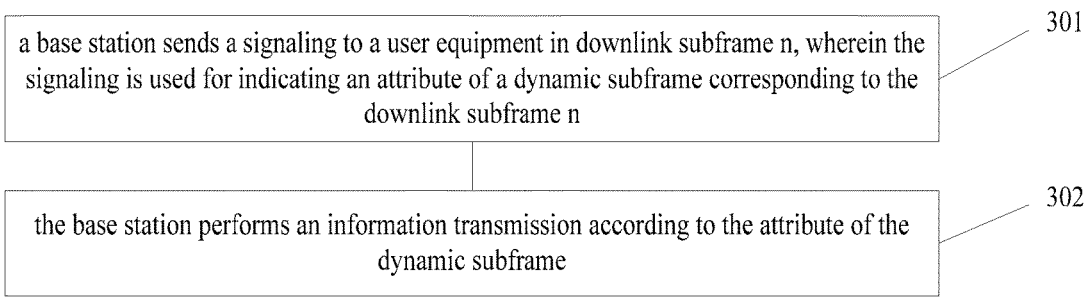
FIG. 3 is a flowchart of another method for information transmission provided by an embodiment of the present disclosure.

With respect to a base station side, another method for information transmission is provided by an embodiment of the present disclosure. As shown in FIG. 3, the method includes the following steps.

301, a base station sends a signaling to a user equipment in downlink subframe n, wherein the signaling is used for indicating an attribute of a dynamic subframe corresponding to the downlink subframe n, n is a subframe serial number in a radio frame, and the attribute of the dynamic subframe refers to that the dynamic subframe is an uplink subframe or that the dynamical subframe is a downlink subframe.

In the present embodiment, when the downlink subframe n is subframe 0 or subframe 5 in a radio frame, a signaling for indicating an attribute of dynamic subframe n+4 is sent to the user equipment in the downlink subframe n. Or, when the downlink subframe n is subframe 1 or subframe 6 in a radio frame, a signaling for indicating an attribute of dynamic subframe n+7 is sent to the user equipment in the downlink subframe n.

In the present embodiment, the signaling may include an uplink indication field, and the description on the signaling and on the uplink indication field is the same as the description in the first manner of step 201, and will not be described redundantly herein.

302, the base station performs an information transmission according to the attribute of the dynamic subframe.

This step corresponds to step 202, namely to perform the information transmission according to a predetermined timing relationship. This step may be detecting, according to a predetermined timing relationship, information sent by the user equipment on a PUSCH. More specifically, the information sent by the user equipment on the PUSCH is detected in dynamic subframe n+4, when in step 301, the downlink subframe n is subframe 0 or subframe 5 in a radio frame, and the most significant bit of the uplink indication field in the signaling is 1; and the information sent by the user equipment on the PUSCH is detected in dynamic subframe n+7, when in step 301, the downlink subframe n is subframe 1 or subframe 6 in a radio frame, and the least significant bit of the uplink indication field in the signaling is 1.

Corresponding to step 203, the present method may further include step 303.

Step 303, information on a PUSCH sent by the user equipment is detected in uplink subframe n+7, when in step 301, the downlink subframe n is subframe 0 or subframe 5 in a radio frame and the least significant bit of the uplink indication field in the signaling is 1; Or, information on a PUSCH sent by the user equipment is detected in uplink subframe n+6, when in step 301, the downlink subframe n is subframe 1 or subframe 6 in a radio frame and most significant bit of the uplink indication field in the signaling is 1.

Step 202 completes an information transmission in a dynamic subframe and step 203 completes an information transmission in a fixed uplink subframe. There is no limitation on the executing order of these two steps and these two steps complete an information transmission in the scenario of applying the dynamic TDD subframe together. Further, the two steps perform the information transmission both according to a predetermined timing relationship, which may specifically be sending a PHICH according to a predetermined timing relationship. The predetermined timing relationship is a timing relationship of the PHICH in a LTE TDD R8 system with uplink-downlink configuration 0, and the timing relationship of the PHICH in the LTE TDD R8 system with uplink-downlink configuration 0 is the timing relationship between a PUSCH transmission and a PHICH transmission in the LTE TDD R8 system with uplink-downlink configuration 0.

In the method for information transmission provided by the embodiment of the present disclosure, an attribute of a dynamic subframe is determined by a user equipment, wherein the attribute of the dynamic subframe indicates that the dynamic subframe is an uplink subframe or that the dynamic subframe is a downlink subframe, and an information transmission is performed according to a predetermined timing relationship, thereby completing the information transmission in a scenario of applying a dynamic TDD subframe. Meanwhile, in the scenario of applying the dynamic TDD subframe, a dynamic subframe may be used for uplink transmission, or used for downlink transmission. Whether the dynamic subframe is used for uplink transmission or downlink transmission may be determined according to an instantaneous service type. In such case, the uplink-downlink configuration is also variable. The embodiment of the present disclosure performs the information transmission according to a fixed timing relationship, no matter how the uplink-downlink configuration varies, thereby having a nature of simple implementation.

Figure 4:
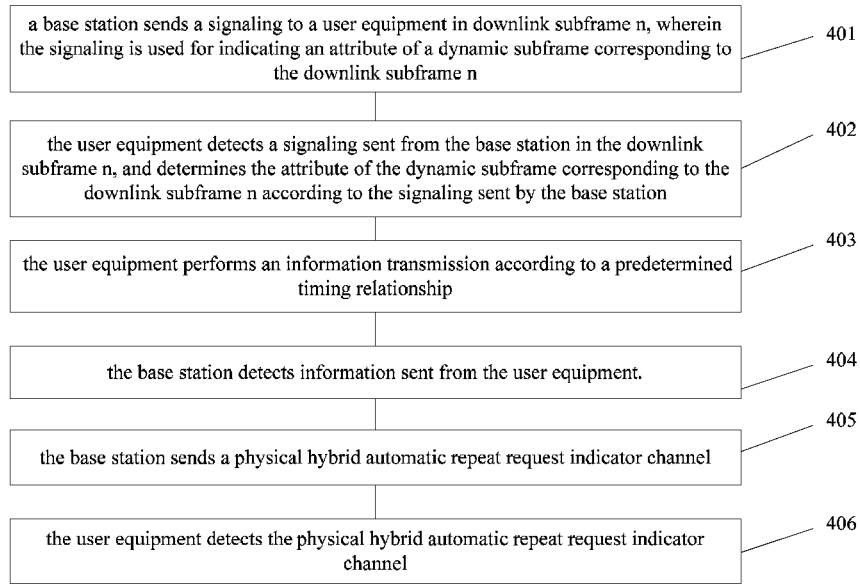
FIG. 4 is a first flowchart of a method for information transmission in a time division duplexing system provided by an embodiment of the present disclosure.

As shown in FIG. 4, the present embodiment provides a specific implementation method for information transmission. The method includes the following steps.

Step 401, a base station sends a signaling to a user equipment in downlink subframe n, wherein the signaling is used for indicating an attribute of a dynamic subframe corresponding to the downlink subframe n, n is a subframe serial number in a radio frame, and the attribute of the dynamic subframe indicates that the dynamic subframe is an uplink subframe or that the dynamical subframe is a downlink subframe.

In the present embodiment, the signaling may be an allocation indication (grant), and the allocation indication may be a physical downlink control channel (PDCCH) signaling carrying downlink control information format 0 or carrying downlink control information format 4. The allocation indication is used for indicating the attribute of the dynamic subframe corresponding to the downlink subframe n, and the attribute of the dynamic subframe indicates that the dynamic subframe is an uplink subframe or that the dynamic subframe is a downlink subframe. Alternatively, the allocation indication is used for indicating an information transmission in the dynamic subframe. Alternatively, the allocation indication is used for indicating the attribute of the dynamic subframe corresponding to the downlink subframe n and an information transmission in the dynamic subframe, wherein the n is a subframe serial number of the downlink subframe, and the attribute of the dynamic subframe indicates that the dynamic subframe is an uplink subframe or that the dynamic subframe is a downlink subframe.

The allocation indication may include an uplink indication field, and the uplink indication field may have the following uses. It may be used for indicating the attribute of the corresponding dynamic subframe, wherein the attribute of the dynamic subframe indicates that the dynamic subframe is an uplink subframe or that the dynamic subframe is a downlink subframe; or used for indicating whether the signaling sent from the base station indicates an information transmission in a fixed uplink subframe or in a dynamic uplink subframe; or used for indicating the attribute of the corresponding dynamic subframe and indicating whether the signaling sent from the base station indicates an information transmission in a fixed uplink subframe or in a dynamic uplink subframe, wherein the attribute of the dynamic subframe indicates that the dynamic subframe is an uplink subframe or that the dynamic subframe is a downlink subframe.

The uplink indication field may be a specific field in the downlink control information format 0 or in the downlink control information format 4. The specific field may have a length of 2 bits. For a user equipment of R8/9/10, the specific field may correspond to an uplink index (UL index) field in the downlink control information format 0 or in the downlink control information format 4, when an uplink-downlink configuration number is 0. Alternatively, the specific field corresponds to a downlink assignment index (DAI) field in the downlink control information format 0 or in the downlink control information format 4, when an uplink-downlink configuration number is within 1~6. Since an existing field may be used as the uplink indication field, it is helpful to save system overhead. Of course, the uplink indication field may also be a newly added field in the downlink control information format 0 or in the downlink control information format 4, wherein the length of the field may be 1 bit or 2 bits, and of course, the field may also be a field with more bits.

In the present embodiment, a role of the assignment indication is illustrated by taking as an example that the length of the uplink indication field in the assignment indication is 2 bits, and the uplink indication field is divided into a most significant bit and a least significant bit.

When the downlink subframe n is subframe 0 (or subframe 5) in a radio frame and the most significant bit of the uplink indication field in the assignment indication of the downlink subframe n is 1, the assignment indication is used for indicating that dynamic subframe n+4 is an uplink subframe and indicating a PUSCH transmission of the dynamic subframe n+4. On the contrary, if the most significant bit of the uplink indication field in the assignment indication of the downlink subframe n is 0, the assignment indication is used for indicating that the dynamic subframe n+4 is a downlink subframe, and the user equipment will detect a PDCCH or a physical downlink shared channel (PDSCH) in the dynamic subframe n+4.

When the downlink subframe n is subframe 1 (or subframe 6) in a radio frame, and the least significant bit of the uplink indication field in the assignment indication of the downlink subframe n is 1, the assignment indication indicates that dynamic subframe n+7 is an uplink subframe and indicates a PUSCH transmission of the dynamic subframe n+7. On the contrary, if the least significant bit of the uplink indication field in the assignment indication of the downlink subframe n is 0, the assignment indication is used for indicating that the dynamic subframe n+7 is a downlink subframe and the user equipment will detect a PDCCH or a PDSCH in the dynamic subframe n+7.

It is to be noted that, in an embodiment of the present disclosure, when the uplink indication field has an exemplary length of 2 bits, and when the downlink subframe n is subframe 0 (or subframe 5) in a radio frame and the least significant bit of the uplink indication field in the assignment indication of the downlink subframe n is 1, the assignment indication is used for indicating a PUSCH transmission of uplink subframe n+7. Similarly, when the downlink subframe n is subframe 1 or (subframe 6) in a radio frame, and the most significant bit of the uplink indication field in the assignment indication of the downlink subframe n is 1, the assignment indication is used for indicating a PUSCH transmission of uplink subframe n+6.

In addition, it is to be noted that, in the above-mentioned assignment indication, a correspondence between the uplink indication field and the attribute of the dynamic subframe and that between the uplink indication field and the PUSCH transmission in the dynamic subframe, or a correspondence between the uplink indication field and the PUSCH transmission in the fixed uplink subframe, are merely preferred correspondences provided by the embodiments of the present disclosure, and of course, other solutions are not excluded. For example, in an embodiment of the present disclosure, the correspondence may be that, when the downlink subframe n is subframe 0 or subframe 5 in a radio frame and the least significant bit of the uplink index field in the assignment indication of the downlink subframe n is 1, the assignment indication is used for indicating that dynamic subframe n+4 is an uplink subframe and indicating a PUSCH transmission in the dynamic subframe; and when the downlink subframe n is subframe 1 or subframe 6 in a radio frame, and the most significant bit of the uplink indication field in the assignment indication of the downlink subframe n is 1, the assignment indication is used for indicating that dynamic subframe n+7 is an uplink subframe and indicating a PUSCH transmission in the dynamic subframe. In such case, when the downlink subframe n is subframe 0 or subframe 5 in a radio frame, and the most significant bit of the uplink indication field in the assignment indication is 1, the assignment indication is used for indicating PUSCH information of the user equipment in uplink subframe n+7. Similarly, when the downlink subframe n is subframe 1 or subframe 6 in a radio frame, and the least significant bit of the uplink indication field in the assignment indication is 1, the assignment indication is used for indicating PUSCH information of the user equipment in subframe n+6.

Step 402, the user equipment detects, in the downlink subframe n, a signaling sent from the base station, and determines the attribute of the dynamic subframe corresponding to the downlink subframe n according to the signaling detected in the downlink subframe n.

In this step, the signaling sent from the base station is the signaling sent from the base station to the user equipment in the downlink subframe n in step 401. As described in step 401, the signaling may be an assignment indication (grant), and the specific description on the assignment indication may be referred to step 401, which is not described redundantly herein. The present step is described in detail below by taking as an example that the signaling sent from the base station is an assignment indication.

For example, when the downlink subframe n is subframe 0 or subframe 5 in a radio subframe and the most significant bit of the uplink indication field in the assignment indication detected by the user equipment in the downlink subframe n is 1, dynamic subframe n+4 is an uplink subframe; and when the downlink subframe n is subframe 1 or subframe 6 in a radio frame, and the least significant bit of the uplink indication field in the assignment indication detected by the user equipment in the downlink subframe n is 1, dynamic subframe n+7 is an uplink subframe. On the contrary, when the downlink subframe n is subframe 0 or subframe 5 in a radio frame, and the most significant bit of the uplink indication field in the assignment indication detected by the user equipment in the downlink subframe n is 0, the dynamic subframe n+4 is a downlink subframe; and when the downlink subframe n is subframe 1 or subframe 6 in a radio frame and the least significant bit of the uplink indication field in the assignment indication detected by the user equipment in the downlink subframe n is 0, the dynamic subframe n+7 is a downlink subframe.

Step 403, the user equipment performs an information transmission according to a predetermined timing relationship.

In this step, the user equipment performs the information transmission according to the assignment indication detected in the downlink subframe n and the attribute of the dynamic subframe determined from the assignment indication in step 402. Step 403 includes not only an information transmission in the dynamic subframe, but also an information transmission in a fixed uplink subframe.

For example, when in step 402, the downlink subframe n is subframe 0 or subframe 5 in a radio frame, and the most significant bit of the uplink indication field in the assignment indication is 1, the user equipment performs a PUSCH transmission in dynamic subframe n+4. When in step 402, the downlink subframe n is subframe 0 or subframe 5 in a radio frame, and the least significant bit of the uplink indication field in the assignment indication is 1, the user equipment performs the PUSCH transmission in uplink subframe n+7. When in step 402, the downlink subframe n is subframe 1 or subframe 6 in a frame and the most significant bit of the uplink indication field in the assignment indication is 1, the user equipment performs the PUSCH transmission in uplink subframe n+6. When in step 402, the downlink subframe n is subframe 1 or subframe 6 in a radio frame, and the least significant bit of the uplink indication field in the assignment indication is 1, the user equipment performs the PUSCH transmission in dynamic subframe n+7.

Preferably, the PUSCH may correspond to the uplink assignment indication, namely that the user equipment performs a transmission of the PUSCH according to related information in the uplink assignment indication. For example, data to be sent in the user equipment is modulated and encoded according to a modulation and coding scheme (MCS) field in the uplink assignment indication, frequency domain resources occupied by the PUSCH are determined by a resource assignment field in the assignment indication, and so on. In such case, the present step may specifically be that, the user equipment sends a PUSCH corresponding to the assignment indication to the base station in dynamic subframe n+4, when the downlink subframe n is subframe 0 or subframe 5 in a radio frame, and the most significant bit of the uplink indication field in the assignment indication detected by the user equipment in the downlink subframe n is 1; the user equipment sends the PUSCH corresponding to the assignment indication to the base station in uplink subframe n+7, when the downlink subframe n is subframe 0 or subframe 5 in a radio frame and the least significant bit of the uplink indication field in the assignment indication detected by the user equipment in the downlink subframe n is 1; the user equipment sends the PUSCH corresponding to the assignment indication to the base station in uplink subframe n+6, when the downlink subframe n is subframe 1 or subframe 6 in a radio frame, and the most significant bit of the uplink indication field in the assignment indication detected by the user equipment in the downlink subframe n is 1; and the user equipment sends the PUSCH corresponding to the assignment indication to the base station in dynamic subframe n+7, when the downlink subframe n is subframe 1 or subframe 6 in a radio frame, and the least significant bit of the uplink indication field in the assignment indication detected by the user equipment in the downlink subframe n is 1.

It is to be noted that, if the assignment indication triggers a transmission of aperiodic channel state information (CSI) simultaneously, the user equipment may also transmit the aperiodic CSI information on the above-mentioned PUSCH. If the assignment indication triggers a transmission of an aperiodic SRS (Sounding Reference Signal) simultaneously, the user equipment may multiplex the aperiodic SRS with the PUSCH in the above-mentioned corresponding dynamic subframe or uplink subframe. For example, a rate matching will be performed regarding the PUSCH, and the aperiodic SRS is transmitted in the last SC-FDMA symbol.

In addition, in this step, if the attribute of the corresponding dynamic subframe determined in step 402 indicates that the dynamic subframe is a downlink subframe, the user equipment detects a PDCCH or a physical downlink shared channel (PDSCH) in the corresponding dynamic subframe.

Step 404, the base station detects information sent from the user equipment.

For example, if in step 401, the base station sends the assignment indication in subframe 0 or subframe 5, and the most significant bit of the uplink indication field in the assignment indication is 1, the base station detects a PUSCH corresponding to the assignment indication in dynamic uplink subframe n+4. If in step 401, the base station sends the assignment indication to the user in subframe 0 or the subframe 5, and the least significant bit of the uplink indication field in the assignment indication is 1, the base station detects, in uplink subframe n+7, information on the PUSCH sent by the user equipment. If in step 401, the base station sends the assignment indication to the user in subframe 1 or subframe 6, and the most significant bit of the uplink indication field in the assignment indication is 1, the base station detects the PUSCH corresponding to the assignment indication in uplink subframe n+6. If in step 401, the base station sends the assignment indication to the user in subframe 1 or subframe 6, and the least significant bit of the uplink indication field in the assignment indication is 1, the base station detects the PUSCH corresponding to the assignment indication in dynamic uplink subframe n+7.

Step 405, the base station sends a physical hybrid automatic repeat request indicator channel (PHICH).

In this step, the base station may send, according to a detection condition regarding the PUSCH in step 404, response information of the corresponding PUSCH in step 404 on the PHICH. In this step, the PHICH may be sent according to a predetermined timing relationship, wherein the predetermined timing relationship is a timing relationship of the PHICH in a LTE TDD R8 system with uplink-downlink configuration 0, and the timing relationship of the PHICH in the LTE TDD R8 system with uplink-downlink configuration 0 is a timing relationship between a PUSCH transmission and a PHICH transmission in the LTE TDD R8 system with uplink-downlink configuration 0.

Step 406, the user equipment detects the PHICH.

In this step, the user equipment may detect the PHICH according to a predetermined timing relationship, wherein the predetermined timing relationship is a timing relationship of the PHICH in a LTE TDD R8 system with uplink-downlink configuration 0.

In the embodiments of the present disclosure, a base station sends an assignment indication to a user equipment in downlink subframe n, and the user equipment detects the assignment indication in the downlink subframe n, determines, according to the assignment indication, an attribute of a dynamic subframe corresponding to the downlink subframe n, and performs an information transmission in the dynamic subframe corresponding to the downlink subframe n, thereby solving the problem how to determine that a dynamic subframe is an uplink subframe or a downlink subframe and the problem of information transmission in a scenario of applying a dynamic TDD subframe. Meanwhile, in the scenario of applying the dynamic TDD subframe, a dynamic subframe may be used for uplink transmission, or used for downlink transmission. Whether the dynamic subframe is used for uplink transmission or downlink transmission may be determined according to a type of an instantaneous service. In this case, the uplink-downlink configuration also varies. The embodiment of the present disclosure performs the information transmission according to a fixed timing relationship, no matter how the uplink-downlink configuration varies, thereby having a nature of simple implementation.

Figure 5:
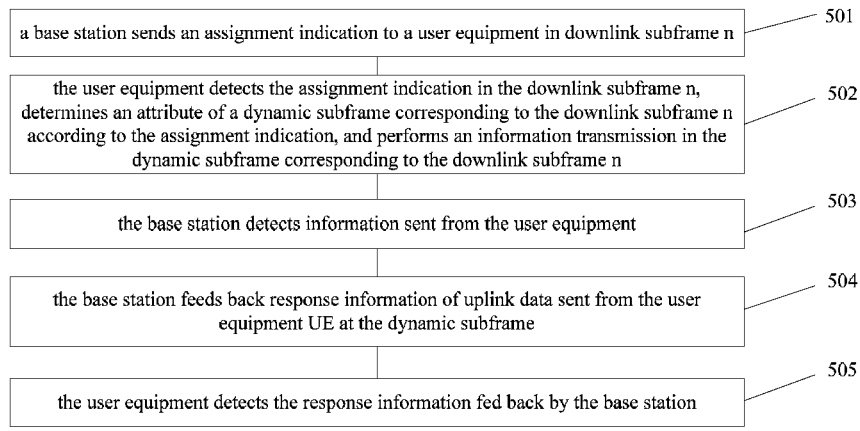
FIG. 5 is a second flowchart of a method for information transmission in a time division duplexing system provided by an embodiment of the present disclosure.

As shown in FIG. 5, the present embodiment provides another specific implementation solution.

Step 501, a base station sends an assignment indication to a user equipment in downlink subframe n, where n is a subframe serial number in a radio frame.

In the present embodiment, the downlink subframe n may be fixed downlink subframe 0 or 5. And in the present embodiment, the assignment indication may include an uplink indication field, and the explanation on the uplink indication field may refer to the embodiment shown in FIG. 4.

When the downlink subframe n is subframe 0 or subframe 5 in a radio frame, and the most significant bit of the uplink indication field in the assignment indication of the downlink subframe n is 1, the assignment indication is used for indicating that dynamic subframe n+4 is an uplink subframe and indicating a PUSCH transmission of the dynamic subframe n+4. On the contrary, if the most significant bit of the uplink indication field is 0, the assignment indication is used for indicating that the dynamic subframe n+4 is a downlink subframe, and the user equipment will detect a PDCCH or a PDSCH in the dynamic subframe n+4. When the downlink subframe n is the subframe 0 or subframe 5 in a radio frame and the least significant bit of the uplink indication field in the assignment indication of the downlink subframe n is 1, the assignment indication is used for indicating that dynamic subframe n+8 is an uplink subframe and indicating a PUSCH transmission of the dynamic subframe n+8. On the contrary, if the least significant bit of the uplink indication field is 0, the dynamic subframe n+8 is a downlink subframe, and the user equipment will detect a PDCCH or a PDSCH in the dynamic subframe n+8.

Alternatively, when the downlink subframe n is subframe 0 or subframe 5 in a radio frame, and the most significant bit of the uplink indication field in the assignment indication of the downlink subframe n is 1, the assignment indication is used for indicating that dynamic subframe n+8 is an uplink subframe and indicating a PUSCH transmission of the dynamic subframe n+8. On the contrary, if the most significant bit of the uplink indication field is 0, the assignment indication is used for indicating that the dynamic subframe n+8 is a downlink subframe, and the user equipment will detect a PDCCH or a PDSCH in the dynamic subframe n+8. When downlink subframe n is subframe 0 or subframe 5 in a radio frame, and the least significant bit of the uplink indication field in the assignment indication of the downlink subframe n is 1, the assignment indication is used for indicating that dynamic subframe n+4 is an uplink subframe and indicating a PUSCH transmission of the dynamic subframe n+4. On the contrary, if the least significant bit of the uplink indication field is 0, then the dynamic subframe n+4 is a downlink subframe and the user equipment will detect a PDCCH or a PDSCH in the dynamic subframe n+4.

In addition, when the downlink subframe n is subframe 0 or subframe 5 in a radio frame and both of the most significant bit and the least significant bit of the uplink indication field in the assignment indication of the downlink subframe n are 1, the assignment indication is used for indicating that both of dynamic subframe n+8 and dynamic subframe n+4 are uplink subframes, and used for indicating PUSCH transmissions in the dynamic subframe n+8 and in the dynamic subframe n+4.

When the downlink subframe n is subframe 1 or subframe 6 in a radio frame, the uplink indication field in the assignment indication of the downlink subframe n may be used for indicating a downlink assignment, which indicates a sum of the number of downlink subframes bearing a PDSCH of the UE and the number of downlink subframes bearing a PDCCH of the UE, among all downlink subframes of a downlink association subframe set corresponding to fixed uplink subframe 7 and fixed uplink subframe 2 in a radio frame, respectively, wherein the PDCCH is used for instructing to release a downlink semi-persistent scheduling (SPS) service of the UE. The embodiments of the present disclosure do not exclude that the downlink assignment indication is explained as other meanings.

Step 502, the user equipment detects the assignment indication in the downlink subframe n, determines an attribute of a dynamic subframe corresponding to the downlink subframe n according to the assignment indication, and performs an information transmission in the dynamic subframe corresponding to the downlink subframe n.

In the present embodiment, the present step may be realized in at least one of following two manners.

In a first manner, when the downlink subframe n is subframe 0 or subframe 5 in a radio frame and the most significant bit of the uplink indication field in the assignment indication detected by the user equipment in the downlink subframe n is 1, the dynamic subframe n+4 is an uplink subframe, and the user equipment sends, in the dynamic subframe n+4, a PUSCH corresponding to the assignment indication. If the least significant bit of the uplink indication field in the assignment indication detected by the user equipment in the downlink subframe n is 1, the dynamic subframe n+8 is an uplink subframe and the user equipment sends, in the dynamic subframe n+8, a PUSCH corresponding to the uplink assignment indication.

In a second manner, when the downlink subframe n is subframe 0 or subframe 5 in a radio frame, and the most significant bit of the uplink indication field in the assignment indication detected by the user equipment in the downlink subframe n is 1, the dynamic subframe n+8 is an uplink subframe, and the user equipment sends, in the dynamic subframe n+8, a PUSCH corresponding to the assignment indication. If the least significant bit of the uplink indication field in the assignment indication detected by the user equipment in the downlink subframe n is 1, the dynamic subframe n+4 is an uplink subframe and the user equipment sends, in the dynamic subframe n+4, a PUSCH corresponding to the uplink assignment indication.

In addition, when the downlink subframe n is subframe 0 or subframe 5 in a radio frame, and both of the most significant bit and the least significant bit of an uplink index field in the assignment indication of the downlink subframe n are 1, both of the dynamic subframe n+8 and the dynamic subframe n+4 are uplink subframes, and the user equipment sends PUSCHs in both of the dynamic subframe n+8 and the dynamic subframe n+4.

When the downlink subframe n is subframe 1 or subframe 6 in a radio frame, and the uplink indication field in the assignment indication of the downlink subframe n is a downlink assignment indication, which indicates a sum of the number of downlink subframes bearing a PDSCH of the UE and the number of downlink subframes bearing a PDCCH of the UE, among all downlink subframes of a downlink association subframe set corresponding to the fixed uplink subframe 7 and the fixed uplink subframe 2 in a radio frame, respectively, wherein the PDCCH is used for instructing to release a downlink semi-persistent scheduling (SPS) service of the UE. The embodiments of the present disclosure do not exclude that the downlink assignment indication is explained as other meanings.

Step 503, the base station detects information sent from the user equipment.

When step 501 is implemented in the first manner, step 503 is that, the base station detects a PUSCH corresponding to the assignment indication in the dynamic uplink subframe n+4, if in step 501, the base station sends the assignment indication to the user in subframe 0 or subframe 5 and the most significant bit of the uplink indication field in the assignment indication is 1; the base station detects the PUSCH corresponding to the assignment indication in the dynamic uplink subframe n+8, if in step 501, the base station sends the assignment indication to the user in subframe 0 or subframe 5 and the least significant bit of the uplink indication field in the assignment indication is 1; and the base station detects the PUSCH corresponding to the assignment indication in the dynamic uplink subframe n+4 and in the dynamic uplink subframe n+8, if in step 501, the base station sends the assignment indication to the user in subframe 0 or subframe 5 and both of the most significant bit and the least significant bit of the uplink indication field in the assignment indication are 1.

When step 501 is implemented in the second manner, step 503 is that, the base station detects the PUSCH corresponding to the assignment indication in the dynamic uplink subframe n+8, if in step 501, the base station sends the assignment indication to the user in subframe 0 or subframe 5 and the most significant bit of the uplink indication field in the assignment indication is 1; the base station detects the PUSCH corresponding to the assignment indication in the dynamic uplink subframe n+4, if in step 501, the base station sends the assignment indication to the user in subframe 0 or subframe 5 and the least significant bit of the uplink indication field in the assignment indication is 1; and the base station detects the PUSCH corresponding to the assignment indication in the dynamic uplink subframe n+4 and in the dynamic uplink subframe n+8, if in step 501, the base station sends the assignment indication to the user in subframe 0 or subframe 5 and both of the most significant bit and the least significant bit of the uplink indication field in the assignment indication are 1.

Step 504, the base station feeds back response information of uplink data sent from the user equipment UE in the dynamic subframe.

When the base station receives a PUSCH sent from the user equipment in dynamic subframe n' in step 503, the base station will feed back response information of the PUSCH, transmitted in the dynamic subframe n', to the user equipment via a PHICH in subframe n'+k'. Values of k' are as shown in Table. 3.

TABLE 3

| | Subframe number n' in a radio frame | | | | | | | | | |
|---|---|---|---|---|---|---|---|---|---|---|
| | 0 | 1 | 2 | 3 | 4 | 5 | 6 | 7 | 8 | 9 |
| Value of k' | | | | 7 | 6 | | | | 7 | 6 |

For example, after the base station receives the PUSCH sent from the user equipment in dynamic subframe 3 of a radio frame, the base station feeds back, in subframe 10 (the value of the subframe serial number n'k'=3+7=10), that is, subframe 0 in a next radio frame, response information of the PUSCH transmitted in the dynamic subframe 3 in the a radio frame to the user equipment. For another example, after the base station receives the PUSCH sent from the user equipment in a dynamic subframe with subframe serial number 28 in multiple radio frames, the base station feeds back, in subframe 35 (the value of the subframe serial number n'k'=28+7=35), that is, subframe 5 of a next radio frame of the radio frame to which the dynamic subframe 28 belongs, response information of the PUSCH transmitted in the dynamic subframe 28 to the user equipment.

In addition, after the user equipment sends the PUSCH in the dynamic subframe n' in step 502, the user equipment will initiatively detect the response information sent from the base station, so as to determine whether the base station receives the PUSCH sent by the user equipment in the dynamic subframe n', namely that the user equipment performs step 505.

Step 505, the user equipment detects the response information fed back by the base station.

After the user equipment sends the PUSCH in the dynamic subframe n' in step 502, the user equipment will detect response information, of the PUSCH transmitted by the user equipment in the dynamic subframe n', fed back by the base station on the PHICH in the subframe n'+k'. Table 3 may be referred to for the corresponding values of n' and k'.

In the embodiments of the present disclosure, a base station sends an assignment indication to a user equipment in downlink subframe n, and the user equipment detects the assignment indication in the downlink subframe n, and performs, according to the assignment indication, an information transmission in a dynamic subframe corresponding to the downlink subframe n, thereby solving the problem how to determine that a dynamic subframe is an uplink subframe or a downlink subframe and the problem of information transmission in a scenario of applying a dynamic TDD subframe. Meanwhile, in the scenario of applying the dynamic TDD subframe, a dynamic subframe may be used for uplink transmission, or used for downlink transmission. Whether the dynamic subframe is used for uplink transmission or downlink transmission may be determined according to a type of an instantaneous service. In such case, the uplink-downlink configuration is also variable. The embodiment of the present disclosure performs the information transmission according to a fixed timing relationship, no matter how the uplink-downlink configuration varies, thereby having a nature of simple implementation.

Figure 6:
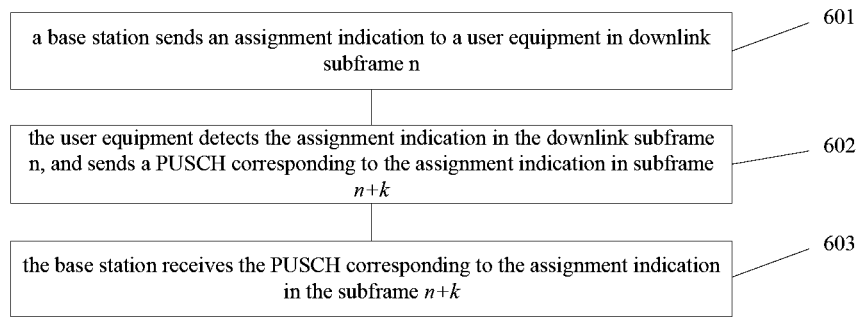
FIG. 6 is a third flowchart of a method for information transmission in a time division duplexing system provided by an embodiment of the present disclosure.

As shown in FIG. 6, the present embodiment provides an embodiment of a method for information transmission in a scenario of applying a dynamic TDD subframe.

Step 601, a base station sends an assignment indication to a user equipment in downlink subframe n, where n is a subframe serial number in a radio frame.

In the present embodiment, the downlink subframe n may be subframe 0, subframe 1, subframe 3, subframe 4, subframe 5, subframe 6, subframe 8, or subframe 9 in a radio frame, i.e., the downlink subframe may be a fixed downlink subframe, a special subframe, or a dynamic subframe for downlink.

In the present embodiment, the assignment indication may be a PDCCH signaling carrying downlink control information format 0 or carrying downlink control information format 4.

Step 602, the user equipment detects the assignment indication in the downlink subframe n, and sends a PUSCH corresponding to the assignment indication in subframe n+k, wherein a value of the k may be as shown in Table 4, and the subframe n+k is an uplink subframe when a value of the n is 9, 0, 4 or 5.

Table 4 may be referred to for the corresponding values of n and k.

TABLE 4

| Subframe number n in a radio frame | | | | | | | | | | |
|---|---|---|---|---|---|---|---|---|---|
| 0 | 1 | 2 | 3 | 4 | 5 | 6 | 7 | 8 | 9 |
| k | 4 | 6 | | 4 | 4 | 4 | 6 | | 4 | 4 |

When the downlink subframe n is subframe 0, subframe 3, subframe 4, subframe 5, subframe 8, or subframe 9 in a radio frame, the user may send a PUSCH corresponding to the assignment indication in subframe n+4. When the downlink subframe n is subframe 1 or subframe 6 in a radio frame, the user equipment may send a PUSCH corresponding to the assignment indication in subframe n+6.

Step 603, the base station receives the PUSCH corresponding to the assignment indication (grant) in the subframe n+k.

In this step, the value of the k may be as shown in Table 4.

According to the method for information transmission provided by the present embodiment, a timing relationship between an assignment indication sent in each downlink subframe and a corresponding uplink subframe is defined in the scenario of applying the dynamic TDD subframe, and the problem how to send and receive information in the dynamic TDD subframe is solved.

Figure 7:
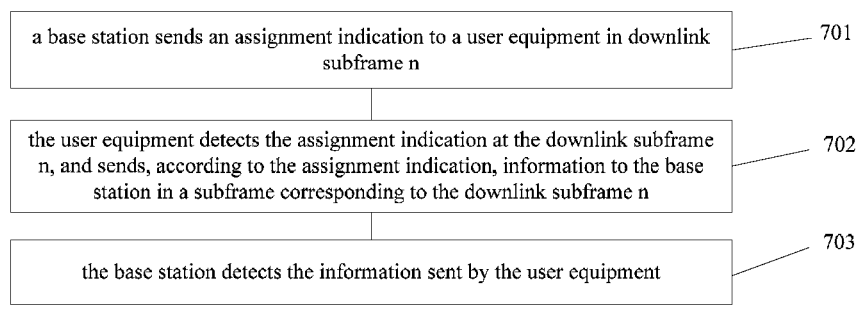
FIG. 7 is a forth flowchart of a method for information transmission in a time division duplexing system provided by an embodiment of the present disclosure.

As shown in FIG. 7, another method for information transmission is provided by the present embodiment. The embodiment of the present disclosure provides a method, which is used for solving the problem how to transmit information in a scenario of applying a dynamic TDD subframe, regarding a scenario used for some specific configurations to which a technology of applying a dynamic subframe is applied. The scenario used for some specific configurations may specifically be one of scenarios represented by configuration numbers 2~5 shown in Table 1, that is, a configuration when the dynamic subframe technology is adopted by a R11UE is one of configurations with configuration numbers 2~5. In such case, actually, only subframe 3 and subframe 4 are dynamic subframes, and subframe 8 and subframe 9 are downlink subframes, thus the subframe 8 and subframe 9 can be utilized to perform a transmission of a corresponding assignment indication.

Step 701, a base station sends an assignment indication to a user equipment in downlink subframe n, where n is a subframe serial number of the downlink subframe.

The downlink subframe n in this step may be subframe 0, subframe 8, subframe 9, or subframe 1 in a radio frame. If the downlink subframe n is subframe 0, subframe 8, or subframe 9 in a radio frame, the assignment indication sent from the base station to the user equipment in the downlink subframe n is used for indicating a PUSCH transmission in subframe n+4. If the downlink subframe n is subframe 1 in a radio frame, the assignment indication sent from the base station to the user equipment in the downlink subframe n is used for indicating a PUSCH transmission in subframe n+6.

Step 702, the user equipment detects the assignment indication in the downlink subframe n, and sends, according to the assignment indication, information to the base station in a subframe corresponding to the downlink subframe n.

When the downlink subframe n is subframe 0, subframe 8, or subframe 9 in a radio frame, the user equipment sends a PUSCH corresponding to the assignment indication to the base station in the subframe n+4. When the downlink subframe n is subframe 1, the user equipment sends a PUSCH corresponding to the assignment indication to the base station in the subframe n+6 corresponding to downlink subframe n. When the downlink subframe n is subframe 0 or subframe 9, the subframe n+4 corresponding to downlink subframe n is a dynamic subframe.

Step 703, the base station detects the information sent by the user equipment.

When the downlink subframe n is subframe 0, subframe 8, or subframe 9 in a radio frame, the base station detects, in the subframe n+4 corresponding to the downlink subframe n, the PUSCH sent from the user equipment. When the downlink subframe n is subframe 1, the base station detects, in the subframe n+6 corresponding to the downlink subframe n, the PUSCH sent from the user equipment.

The present embodiment provides a method regarding a scenario used for some specific configurations (e.g., configuration numbers 2~5), to which a technology of applying a dynamic subframe is applied, thereby solving, in the scenario used for the above-mentioned specific configurations, the problem how to determine that a dynamic subframe is an uplink subframe or a downlink subframe and that of information transmission in the scenario of applying the dynamic TDD subframe.

In addition to be applied to the transmission of control information in the scenario of applying the dynamic TDD subframe, all embodiments of the present disclosure may also be applicable to a transmission of control information in a scenario in which a FDD/TDD flexible spectrum is used. The scenario, in which the flexible FDD/TDD flexible spectrum is used, indicates that uplink recourse in a system is used for downlink transmission in some subframes.

Figure 8:
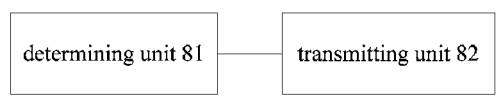
FIG. 8 is a block diagram of an apparatus for information transmission in a time division duplexing system provided by an embodiment of the present disclosure.

The present embodiment below further provides an apparatus for information transmission in a time division duplexing system corresponding to the above-mentioned methods. The apparatus may be a functional module of a user equipment. As shown in FIG. 8, the apparatus includes a determining unit 81 and a transmitting unit 82.

The determining unit 81 is configured to determine an attribute of a dynamic subframe, wherein the attribute of the dynamic subframe indicates that the dynamic subframe is an uplink subframe or that the dynamic subframe is a downlink subframe.

The determining unit 81 may include a first detecting subunit and a first determining subunit.

The first detecting subunit is configured to detect a signaling sent from a base station.

The signaling sent from the base station may include an uplink indication field, and the uplink indication field may have the following uses. It may be used for indicating an attribute of a corresponding dynamic subframe, or used for indicating whether the signaling sent from the base station indicates an information transmission in a fixed uplink subframe or in a dynamic uplink subframe, or used for indicating an attribute of a corresponding dynamic subframe and indicating whether the signaling sent from the base station indicates an information transmission in a fixed uplink subframe or in a dynamic uplink subframe.

The signaling sent from the base station may be an assignment indication (grant), wherein the assignment indication may be a PDCCH signaling carrying downlink control information format 0 or carrying downlink control information format 4.

The uplink indication field may correspond to a downlink assignment indication field in downlink control information format 0 or in downlink control information format 4, or correspond to an uplink index field in downlink control information format 0 or downlink control information format 4, or be a newly added field in downlink control information format 0 or in downlink control information format 4.

The first determining subunit is configured to determine the attribute of the dynamic subframe according to the detected signaling.

The first determining subunit may be configured to determine that the dynamic subframe is an uplink subframe or a downlink subframe according to the uplink indication field in the signaling detected by the first detecting subunit.

Alternatively, the determining unit 81 may include a second detecting subunit and a second determining subunit.

The second detecting subunit is configured to detect a signaling sent from a base station in downlink subframe n, where n is a subframe serial number of the downlink subframe.

The signaling sent from the base station may include an uplink indication field. The description on the signaling sent from the base station and on the uplink indication field included in the signaling is the same as the description in the first detecting subunit, which will not be described redundantly herein.

The second determining subunit is configured to determine the attribute of the dynamic subframe corresponding to the downlink subframe n according to the signaling detected in the downlink subframe n.

The second determining subunit may be configured to determine that the dynamic subframe corresponding to the downlink subframe n is an uplink subframe or a downlink subframe according to the uplink indication field in the signaling detected by the second detecting subunit in the downlink subframe n.

The transmitting unit 82 is configured to perform an information transmission according to the attribute of the dynamic subframe.

Specifically, in a radio frame, an information transmission needs to be performed according to a predetermined timing relationship, and it may be performing a PUSCH transmission according to a predetermined timing relationship. With respect to a dynamic subframe in the radio frame, the information transmission further needs to be performed by combining with the attribute of the dynamic subframe. The predetermined timing relationship may be a timing relationship of a PUSCH in a LTE TDD R8 system with uplink-downlink configuration 0, that is, a timing relationship between downlink control information (DCI) format 0 and its corresponding PUSCH transmission in the LTE TDD R8 system with uplink-downlink configuration 0. Alternatively, the performing an information transmission according to a predetermined timing relationship is detecting a PHICH according to a predetermined timing relationship, wherein the predetermined timing relationship may be a timing relationship of the PHICH in a LTE TDD R8 system with uplink-downlink configuration 0, and the timing relationship of the PHICH in the LTE TDD R8 system with uplink-downlink configuration 0 is a relationship between a PUSCH transmission and a PHICH transmission in the LTE TDD R8 system with uplink-downlink configuration 0.

In addition, if the first detecting subunit (or the second detecting subunit) does not receive any signaling for indicating the attribute of the dynamic subframe sent from the base station, the dynamic subframe is determined to be a downlink subframe by the first determining subunit (or the second determining subunit).

Furthermore, the PUSCH may correspond to the assignment indication, that is, if the signaling sent from the base station is an assignment indication, the user equipment performs a transmission of the PUSCH corresponding to the assignment indication in the dynamic subframe.

In the apparatus provided by the embodiment of the present disclosure, an attribute of a dynamic subframe is determined by the determining unit 81, and the information transmission is performed by the transmitting unit 82 according to the attribute of the dynamic subframe, thereby completing a transmission of information in the scenarios of applying the dynamic TDD subframe.

Preferably, the downlink subframe n in the second detecting subunit is subframe 0, subframe 5, subframe 1 or subframe 6 in a radio frame.

In the case that the downlink subframe n is subframe 0 or subframe 5 in a radio frame, the second determining subunit is configured to determine the attribute of dynamic subframe n+4 corresponding to the downlink subframe n according to the signaling detected in the downlink subframe n.

In the case that the downlink subframe n is subframe 1 or subframe 6 in a radio frame, the second determining subunit is configured to determine the attribute of dynamic subframe, subframe n+7, corresponding to the downlink subframe n according to the signaling detected in the downlink subframe n.

The signaling detected in the downlink subframe n may be an assignment indication, and the length of uplink indication field in the assignment indication has an exemplary length of 2 bits. For example, the second detecting subunit is specifically configured to detect the assignment indication sent from the base station in downlink subframe 0, downlink subframe 5, downlink subframe 1 or downlink subframe 6 in a radio frame.

When the downlink subframe n is subframe 0 or subframe 5 in a radio frame and the most significant bit of the uplink indication field in the assignment indication detected in the downlink subframe n is 1, the second determining subunit determines that dynamic subframe n+4 is an uplink subframe. On the contrary, if the most significant bit is 0, the second determining subunit determines that the dynamic subframe n+4 is a downlink subframe.

When the downlink subframe n is subframe 1 or subframe 6 in a radio frame and the least significant bit of the uplink indication field in the assignment indication detected in the downlink subframe n is 1, the second determining subunit determines that dynamic subframe n+7 is an uplink subframe. On the contrary, if the least significant bit is 0, the second determining subunit determines that the dynamic subframe n+7 is a downlink subframe.

At this time, in the case that the downlink subframe n is subframe 0 or subframe 5 in a radio frame and the most significant bit of the uplink indication field in the assignment indication detected in the downlink subframe n is 1, the transmitting unit 82 is configured to perform a PUSCH transmission in the dynamic subframe n+4. On the contrary, if the most significant bit is 0, the transmitting unit 82 may be further configured to detect a PDCCH or a PDSCH in the dynamic subframe n+4.

In the case that the downlink subframe n is subframe 1 or subframe 6 in a radio frame and the least significant bit of the uplink indication field in the assignment indication detected in the downlink subframe n is 1, the transmitting unit 82 is configured to perform an PUSCH transmission in the dynamic subframe n+7. On the contrary, if the least significant bit is 0, the transmitting unit 82 may be further configured to detect a PDCCH or a PDSCH in the dynamic subframe n+7.

Furthermore, the assignment indication may be further used for indicating an information transmission in a fixed uplink subframe, and in such case, the transmitting unit 82 is further configured to perform an information transmission in the fixed uplink subframe.

For example, in the case that the downlink subframe n is subframe 0 or subframe 5 in a radio frame and the least significant bit of the uplink indication field in the signaling sent from the base station is 1, the transmitting unit 82 is configured to perform a PUSCH transmission in fixed uplink subframe n+7.

In the case that the downlink subframe n is subframe 1 or subframe 6 in a radio frame and the most significant bit of the uplink indication field in the signaling sent from the base station is 1, the transmitting unit 82 is configured to perform a PUSCH transmission in fixed uplink subframe n+6.

It should be noted that, in the above-mentioned assignment indication, a correspondence between an uplink indication field and an attribute of a dynamic subframe and that between the uplink indication field and an information transmission in the dynamic subframe, or a correspondence between an uplink indication field and an information transmission in a fixed uplink subframe, are merely preferred correspondences, regarding the downlink subframe n and the dynamic subframe (or the fixed uplink subframe), provided by the embodiments of the present disclosure, and of course, other solutions are not excluded.

The apparatus provided by the embodiment of the present disclosure detects the assignment indication in the downlink subframe n by the second detecting subunit, determines, by the second determining subunit, the attribute of the dynamic subframe corresponding to the downlink subframe n according to the assignment indication, and performs the information transmission in the dynamic subframe corresponding to the downlink subframe n, thereby solving the problem how to determine that a dynamic subframe is an uplink subframe or a downlink subframe and the problem of information transmission in the scenario of applying the dynamic TDD subframe.

Or preferably, the signaling sent from the base station is an assignment indication, the assignment indication includes an uplink indication field for indicating an attribute of a dynamic subframe, the attribute of the dynamic subframe indicates that the dynamic subframe is an uplink subframe or that the dynamic subframe is a downlink subframe, and a length of the uplink indication field is 2 bits.

The downlink subframe n in the second detecting subunit is subframe 0 or subframe 5 in a radio frame.

In the case that the downlink subframe n is subframe 0 or subframe 5 in a radio frame and the most significant bit of the uplink indication field in the assignment indication sent from the base station is 1, the second determining subunit determines that dynamic subframe n+4 corresponding to the downlink subframe n is an uplink subframe according to the assignment indication detected in the downlink subframe n, and the transmitting unit 82 is configured to perform a PUSCH transmission in the dynamic subframe n+4. On the contrary, if the most significant bit is 0, the second determining subunit determines that the dynamic subframe n+4 corresponding to the downlink subframe n is a downlink subframe according to the assignment indication detected in the downlink subframe n, and the transmitting unit 82 is configured to detect a PDCCH or a PDSCH in the dynamic subframe n+4.

In the case that the downlink subframe n is subframe 0 or subframe 5 in a radio frame and the least significant bit of the uplink indication field in the assignment indication sent from the base station is 1, the second determining subunit determines that dynamic subframe n+8 corresponding to the downlink subframe n is an uplink subframe according to the assignment indication detected in the downlink subframe n, and the transmitting unit 82 is configured to perform a PUSCH transmission in the dynamic subframe n+8. On the contrary, if the least significant bit is 0, the second determining subunit determines that the dynamic subframe n+8 corresponding to the downlink subframe n is a downlink subframe according to the assignment indication detected in the downlink subframe n, and the transmitting unit 82 is configured to detect a PDCCH or a PDSCH in the dynamic subframe n+8.

In the apparatus provided by the embodiment of the present disclosure, the assignment indication is detected by the second detecting subunit in the downlink subframe n, the attribute of the dynamic subframe corresponding to the downlink subframe n is determined by the second determining subunit according to the assignment indication, and the information transmission is performed in the dynamic subframe corresponding to the downlink subframe n, thereby solving the problem how to determine that a dynamic subframe is an uplink subframe or a downlink subframe and the problem of information transmission in the scenario of applying the dynamic TDD subframe.

Or preferably, the signaling sent from the base station is an assignment indication. The downlink subframe in the second detecting subunit is subframe 0, subframe 4, subframe 5 or subframe 9 in a radio frame, the dynamic subframe corresponding to the downlink subframe n is subframe n+4.

In such case, the second determining subunit is configured to determine that the dynamic subframe n+4 corresponding to the downlink subframe n is an uplink subframe according to the assignment indication sent from the base station, in the case that the downlink subframe n is subframe 0, subframe 4, subframe 5 or subframe 9 in a radio frame.

Specifically, the transmitting unit 82 is configured to perform a PUSCH transmission in the dynamic subframe n+4 corresponding to the downlink subframe n, in the case that that downlink subframe n is subframe 0, subframe 4, subframe 5 or subframe 9 in a radio frame.

In addition, the transmitting unit 82 may be further configured to indicate a transmission of information in a fixed uplink subframe. For example, in the case that the downlink subframe n is subframe 3 or subframe 8 in a radio frame, the transmitting unit 82 is configured to perform a PUSCH transmission in fixed uplink subframe n+4 corresponding to the downlink subframe n; and in the case that the downlink subframe n is subframe 1 or subframe 6, the transmitting unit 82 is configured to perform a PUSCH transmission in fixed uplink subframe n+6 corresponding to the downlink subframe n.

The apparatus provided by the embodiment of the present disclosure defines a timing relationship between an assignment indication sent in each downlink subframe and its corresponding uplink subframe in the scenario of applying the dynamic TDD subframe, thereby solving the problem how to send and receive information in the dynamic TDD subframe.

In addition, with respect to a scenario used for some special configurations, which may specifically be one of the scenarios represented by configuration numbers 2~5 in Table 1, i.e., a configuration when the dynamic subframe technology is employed by an R11 UE is one of configurations with configuration numbers 2~5. In this case, actually, only subframe 3 and subframe 4 are dynamic subframes, and subframe 8 and subframe 9 are downlink subframes, thus the subframe 8 and subframe 9 can be utilized to perform a transmission of a corresponding assignment indication.

The downlink subframe n in the second detecting subunit is subframe 0 or subframe 9 in a radio frame, the dynamic subframe corresponding to the downlink subframe n is subframe n+4.

In such case, the second determining subunit is configured to determine that the dynamic subframe n+4 corresponding to the downlink subframe n is an uplink subframe according to the assignment indication detected in the downlink subframe n, in the case that the downlink subframe n is subframe 0 or subframe 9 in a radio frame.

In such case, the transmitting unit 82 is configured to perform a PUSCH transmission in the dynamic subframe n+4 corresponding to the downlink subframe, in the case that the downlink subframe n is subframe 0 or subframe 9.

In addition, the transmitting unit 82 may be further configured to perform a transmission of information in a fixed uplink subframe. In the case that the downlink subframe n is subframe 8 in a radio frame, the transmitting unit 82 is configured to perform a PUSCH transmission in fixed uplink subframe n+4 corresponding to the downlink subframe n. In the case that the downlink subframe n is subframe 1 in a radio frame, the transmitting unit 82 is configured to perform a PUSCH transmission in fixed uplink subframe n+6 corresponding to the downlink subframe n.

The present embodiment provides an apparatus regarding a scenario used for some specific configurations (e.g., configuration numbers 2~5), to which a technology of applying a dynamic subframe is applied, thereby solving, in the scenario used for the above-mentioned specific configurations, the problem how to determine that a dynamic subframe is an uplink subframe or a downlink subframe and that of information transmission in the scenario of applying the dynamic TDD subframe.

Figure 9:
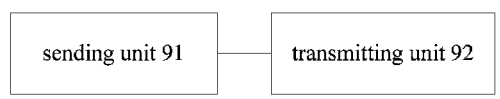
FIG. 9 is a block diagram of another apparatus for information transmission in a time division duplexing system provided by an embodiment of the present disclosure.

The present embodiment below further provides an apparatus for information transmission in a time division duplexing system corresponding to the above-mentioned apparatus. The apparatus may be a functional module of a base station. As shown in FIG. 9, the apparatus includes a sending unit 91 and a transmitting unit 92.

The sending unit 91 is configured to send a signaling to a user equipment in downlink subframe n, wherein the signaling is used for indicating an attribute of a dynamic subframe corresponding to the downlink subframe n, n is a subframe serial number in a radio frame, and the attribute of the dynamic subframe indicates that the dynamic subframe is an uplink subframe or that the dynamic subframe is a downlink subframe The signaling may be an assignment indication and the signaling may include an uplink indication field. Description on the signaling, the assignment indication and on the uplink indication field may be referred to the above-mentioned description, and will not be described redundantly herein.

The transmitting unit 92 is configured to perform an information transmission according to the attribute of the dynamic subframe.

Specifically, in a radio frame, an information transmission needs to be performed according to a predetermined timing relationship, wherein the predetermined timing relationship is a timing relationship of a PHICH in a LTE TDD R8 system with uplink-downlink configuration 0, and the timing relationship of the PHICH in the LTE TDD R8 system with uplink-downlink configuration 0 is a timing relationship between a PUSCH transmission and a PHICH transmission in the LTE TDD R8 system with uplink-downlink configuration 0.

The apparatus provided by the embodiment of the present disclosure determines the attribute of the dynamic subframe by the determining unit 91, and performs, by the transmitting unit 92, the information transmission according to the attribute of the dynamic subframe, thereby completing the information transmission in the scenario of applying the dynamic TDD subframe.

Preferably, the downlink subframe n in the sending unit 91 is subframe 0, subframe 5, subframe 1 or subframe 6 in a radio frame.

In the case that the downlink subframe n is subframe 0 or subframe 5 in a radio frame, the sending unit 91 is configured to send a signaling, which is used for indicating the attribute of dynamic subframe n+4, to the user equipment in the downlink subframe n.

In the case that the downlink subframe n is subframe 1 or subframe 6 in a radio frame, the sending unit 91 is configured to send a signaling for indicating the attribute of dynamic subframe n+7 to the user equipment in the downlink subframe n.

It is assumed that the signaling is an assignment indication and a length of an uplink indication field in the assignment indication is 2 bits.

When the downlink subframe n is subframe 0 or subframe 5 in a radio frame and a most significant bit of the uplink indication field in the assignment indication is 1, the assignment indication is used for indicating that the dynamic subframe n+4 is an uplink subframe.

When the downlink subframe n is subframe 1 or subframe 6 in a radio frame and a least significant bit of the uplink indication field in the assignment indication is 1, the assignment indication is used for indicating that the dynamic subframe n+7 is an uplink subframe.

At this time, in the case that the downlink subframe n is subframe 0 or subframe 5 in a radio frame, and the most significant bit of the uplink indication field in the assignment indication is 1, the transmitting unit 92 is configured to detect information sent from the user equipment on a PDSCH in the dynamic subframe n+4.

In the case that the downlink subframe n is subframe 1 or subframe 6 in a radio frame, and the least significant bit of the uplink indication field in the assignment indication is 1, information sent from the user equipment on a PDSCH is detected in the dynamic subframe n+7.

Furthermore, the assignment indication may be further used for indicating an information transmission in a fixed uplink subframe, thus the transmitting unit 92 may be further configured to perform an information transmission in the fixed uplink subframe.

For example, in the case that the downlink subframe n is subframe 0 or subframe 5 in a radio frame, and the least significant bit of the uplink indication field in the assignment indication is 1, the transmitting unit 92 is configured to detect, in the dynamic subframe n+7, information on a PDSCH sent from the user equipment In the case that the downlink subframe n is subframe 1 or subframe 6 in a radio frame, and the most significant bit of the uplink indication field in the assignment indication is 1, the transmitting unit 92 is configured to detect information sent from the user equipment on the PDSCH in the dynamic subframe n+6.

Or preferably, the signaling in the sending unit 91 is an assignment indication, the assignment indication includes an uplink indication field for indicating the attribute of the dynamic subframe, wherein the attribute of the dynamic subframe indicates that the dynamic subframe is an uplink subframe or that the dynamic subframe is a downlink subframe, and a length of the uplink indication field is 2 bits.

In the case that the downlink subframe n is subframe 0 or subframe 5 in a radio frame, and a most significant bit of the uplink indication field in the assignment field sent by the base station is 1, the assignment indication is used for indicating that dynamic subframe n+4 corresponding to the downlink subframe n is an uplink subframe, and the transmitting unit 92 is configured to detect, in the dynamic subframe n+4, information on a PUSCH sent by the user equipment.

In the case that the downlink subframe n is subframe 0 or subframe 5 in a radio frame, and a least significant bit of the uplink indication field in the assignment field sent by the base station is 1, the assignment indication is used for indicating that dynamic subframe n+8 corresponding to the downlink subframe n is an uplink subframe, and the transmitting unit 92 is configured to detect, in the dynamic subframe n+8, information on the PUSCH sent by the user equipment.

Or preferably, the signaling sent from the base station is an assignment indication. The downlink subframe n in the sending unit 91 is subframe 0, subframe 4, subframe 5 or subframe 9 in a radio frame, and the dynamic subframe corresponding to the downlink subframe n is subframe n+4.

In such case, the transmitting unit 92 is specifically configured to detect, in the dynamic subframe n+4 corresponding to the downlink subframe, information on a PUSCH sent by the user equipment, in the case that the downlink subframe is subframe 0, subframe 4, subframe 5 or subframe 9.

In addition, the transmitting unit 92 may be further configured to detect, in fixed uplink subframe n+4 corresponding to the downlink subframe n, information on a PUSCH sent from the user equipment, in the case that the downlink subframe n is subframe 3 or subframe 8. Or, the transmitting unit 92 is configured to detect, in fixed uplink subframe n+6 corresponding to the downlink subframe n, information on a PUSCH sent from the user equipment, in the case that the downlink subframe n is subframe 1 or subframe 6.

In addition, the scenario used for some specific configurations may specifically be one of scenarios represented by configuration sequence numbers 2~5 shown in Table 1, that is, a configuration after employing the dynamic subframe technology by a R11UE is one of configurations with configuration sequence numbers 2~5. In this case, actually, only subframe 3 and subframe 4 are dynamic subframes, and subframe 8 and subframe 9 are downlink subframes, thus the subframe 8 and subframe 9 can be utilized to perform a transmission of a corresponding assignment indication.

The downlink subframe n in the sending unit 91 is subframe 0 or subframe 9 in a radio frame, and the dynamic subframe corresponding to the downlink subframe n is subframe n+4.

In such case, the transmitting unit 92 is specifically configured to detect, in the dynamic subframe n+4 corresponding to the downlink subframe, information on the PUSCH sent by the user equipment, in the case that the downlink subframe n is subframe 0 or subframe 9 in a radio frame.

In addition, the transmitting unit 92 may be further configured to detect, in fixed uplink subframe n+4 corresponding to the downlink subframe n, information on the PUSCH sent from the user equipment, in the case that the downlink subframe n is subframe 8 in a radio frame; and the transmitting unit 92 is configured to detect, in fixed uplink subframe n+6 corresponding to the downlink subframe n, information on the PUSCH sent from the user equipment, in the case that the downlink subframe n is subframe 1 in a radio frame.

It is to be noted that the above-mentioned assumption is merely a preferable correspondence regarding the downlink subframe n and the dynamic subframe (or the fixed uplink subframe) provided by the embodiments of the present disclosure. Of course, other solutions are not excluded.

In the apparatus provided by the embodiment of the present disclosure, the sending unit 91 of the base station sends the signaling to the user in the downlink subframe n, such that the transmitting unit 92 performs the information transmission in the dynamic subframe corresponding to downlink subframe n according to the attribute of the dynamic subframe indicated by the signaling, thereby solving a problem how to determine that a dynamic subframe is an uplink subframe or a downlink subframe and the problem of information transmission in the scenario of applying the dynamic TDD subframe.

Based on the above-mentioned descriptions of the embodiments, those skilled in the art may understand clearly that the present disclosure may be implemented by software with necessary universal hardware, of course, it may also be implemented just by software, but the former is a better implementation in many cases. Base on such understanding, the technical solutions in the present disclosure per se, or the parts that make contributions to the prior art, of the technical solutions in the present disclosure may be embodied in the form of a software product. The computer software product is stored in a readable storage medium, such as a soft disk of a computer, a hard disk, or an optical disk, or the like. The computer software product includes a number of instructions that enable a computer device, which may be a personal computer, a server, or a network device, to execute the method described in the respective embodiments of the present disclosure.

The foregoing descriptions are merely specific embodiments of the disclosure, rather than limiting the protection scope of the disclosure. It is easy for those skilled in the art to conceive changes or substitutions within the technical scope disclosed by the disclosure, and the changes or substitutions should fall in the protection scope of the disclosure. Therefore, the protection scope of the present disclosure shall be defined by the claims.

What is claimed is:

1. A method for indicating an attribute of a dynamic subframe, comprising:
   detecting, by a user equipment, a signaling sent from a base station, wherein the detected signaling is downlink control information comprising an uplink indication field, wherein the uplink indication field indicates the attribute of the dynamic subframe;
   determining, by the user equipment, the attribute of the dynamic subframe according to the detected signaling, wherein the attribute of the dynamic subframe indicates that the dynamic subframe is an uplink subframe or that the dynamic subframe is a downlink subframe; and
   performing, by the user equipment, an information transmission according to the attribute of the dynamic subframe;
   wherein detecting the signaling sent from the base station comprises:
   detecting by the user equipment the signaling sent from the base station in downlink subframe n, where n is a subframe serial number in a radio frame;
   wherein determining the attribute of the dynamic subframe according to the detected signaling comprises:
   determining, by the user equipment, the attribute of the dynamic subframe corresponding to the downlink subframe n according to the signaling detected in the downlink subframe n;
   wherein determining the attribute of the dynamic subframe corresponding to the downlink subframe n according to the signaling detected in the downlink subframe n comprises:
   determining, by the user equipment, that dynamic subframe n+4 is an uplink subframe, when the downlink subframe n is subframe 0 or subframe 5 in the radio frame and the most significant bit of the uplink indication field in the signaling detected in the downlink subframe n is 1; or
   determining, by the user equipment, that dynamic subframe n+7 is an uplink subframe, when the downlink subframe n is subframe 1 or subframe 6 in the radio frame and the least significant bit of the uplink indication field in the signaling detected at the downlink subframe n is 1.

2. The method according to claim 1, wherein performing the information transmission according to the attribute of the dynamic subframe comprises:
   performing, by the user equipment, a physical uplink shared channel transmission in the dynamic subframe n+4, when the downlink subframe n is the subframe 0 or the subframe 5 in the radio frame and the most significant bit of the uplink indication field in the signaling detected in the downlink subframe n is 1; or
   performing, by the user equipment, a physical uplink shared channel transmission in the dynamic subframe n+7, when the downlink subframe n is the subframe 1 or the subframe 6 in the radio frame and the least significant bit of the uplink indication field in the signaling detected in the downlink subframe n is 1.

3. The method according to claim 1, wherein:
   the uplink indication field corresponds to a downlink assignment indication field in a downlink control information format 0 or in a downlink control information format 4; or
   the uplink indication field corresponds to an uplink index field in a downlink control information format 0 or in a downlink control information format 4.

4. The method according to claim 1, wherein determining the attribute of the dynamic subframe corresponding to the downlink subframe n according to the signaling detected in the downlink subframe n comprises:
   determining, by the user equipment, a first attribute of a first dynamic subframe according to the most significant bit of the uplink indication field and a second attribute of a second dynamic subframe according to the least significant bit of the uplink indication field.

5. The method according to claim 1, wherein the uplink indication field is a field of 2 bits, and wherein the uplink indication field is divided into the most significant bit and the least significant bit.

6. An apparatus for indicating an attribute of a dynamic subframe in a time division duplexing system, comprising:
   a processor, configured to detect a signaling sent from a base station, wherein the detected signaling is downlink control information comprising an uplink indication field, wherein the uplink indication field indicates the attribute of the dynamic subframe, and to determine the attribute of the dynamic subframe according to the detected signaling, wherein the attribute of the dynamic subframe indicates that the dynamic subframe is an uplink subframe or that the dynamic subframe is a downlink subframe; and a transmitter, configured to perform an information transmission according to the attribute of the dynamic subframe;

wherein detecting the signaling sent from the base station comprises:
  detecting the signaling sent from the base station in downlink subframe n, where n is a subframe serial number in a radio frame;
wherein determining the attribute of the dynamic subframe according to the detected signaling comprises:
  determining the attribute of the dynamic subframe corresponding to the downlink subframe n according to the signaling detected in the downlink subframe n;
wherein determining the attribute of the dynamic subframe corresponding to the downlink subframe n according to the signaling detected in the downlink subframe n comprises:
  determining that dynamic subframe n+4 is an uplink subframe, when the downlink subframe n is subframe 0 or subframe 5 in the radio frame and the most significant bit of the uplink indication field in the signaling detected in the downlink subframe n is 1; or
  determining that dynamic subframe n+7 is an uplink subframe, when the downlink subframe n is subframe 1 or subframe 6 in the radio frame and the least significant bit of the uplink indication field in the signaling detected at the downlink subframe n is 1.

7. The apparatus according to claim 6, wherein:
the transmitter is configured to perform a physical uplink shared channel transmission in the dynamic subframe n+4, when the downlink subframe n is the subframe 0 or the subframe 5 in the radio frame and the most significant bit of the uplink indication field in the signaling detected in the downlink subframe n is 1; or
the transmitter is configured to perform a physical uplink shared channel transmission in the dynamic subframe n+7, when the downlink subframe n is subframe 1 or subframe 6 in the radio frame and the least significant bit of the uplink indication field in the signaling detected in the downlink subframe n is 1.

8. The apparatus according to claim 6, wherein the processor is configured to determine a first attribute of a first dynamic subframe according to the most significant bit of the uplink indication field and a second attribute of a second dynamic subframe according to the least significant bit of the uplink indication field.

9. The apparatus according to claim 6, wherein the uplink indication field is a field of 2 bits, and wherein the uplink indication field is divided into the most significant bit and the least significant bit.

10. An apparatus for indicating an attribute of a dynamic subframe in a time division duplexing system, comprising:
a transmitter, configured to send, in downlink subframe n, a signaling for indicating an attribute of a dynamic subframe corresponding to the downlink subframe n to a user equipment, wherein n is a subframe serial number in a radio frame and the attribute of the dynamic subframe indicates that the dynamic subframe is an uplink subframe or that the dynamic subframe is a downlink subframe, wherein the signaling in the subframe n is downlink control information comprising an uplink indication field, and the uplink indication field is used for indicating the attribute of the dynamic subframe;

wherein the transmitter is further configured to perform an information transmission according to the attribute of the dynamic subframe;

wherein:
  the transmitter is configured to send the signaling for indicating the attribute of dynamic subframe n+4 to the user equipment in the downlink subframe n, when the downlink subframe n is subframe 0 or subframe 5 in the radio frame; or
  the transmitter is configured to send the signaling for indicating the attribute of dynamic subframe n+7 to the user equipment in the downlink subframe n, when the downlink subframe n is subframe 1 or subframe 6 in the radio frame;
wherein the apparatus further comprises a processor, wherein:
  the processor is configured to detect, in the dynamic subframe n+4, information on a physical uplink shared channel sent from the user equipment, when the downlink subframe n is subframe 0 or subframe 5 in the radio frame and the most significant bit of the uplink indication field in the signaling is 1; or
  the processor is configured to detect, in the dynamic subframe n+7, information on a physical uplink shared channel sent from the user equipment, when the downlink subframe n is subframe 1 or subframe 6 in the radio frame and the least significant bit of the uplink indication field in the signaling is 1.

11. The apparatus according to claim 10, further comprising: a processor, wherein:
  the processor is further configured to detect, in uplink subframe n+7, information on a physical uplink shared channel sent from the user equipment, when the downlink subframe n is subframe 0 or subframe 5 in the radio frame and the least significant bit of the uplink indication field in the signaling is 1; or
  the processor is further configured to detect, in uplink subframe n+6, information on a physical uplink shared channel sent from the user equipment, when the downlink subframe n is the subframe 1 or the subframe 6 in the radio frame and the most significant bit of the uplink indication field in the signaling is 1.

12. The apparatus according to claim 10, wherein:
the uplink indication field corresponds to a downlink assignment indication field in a downlink control information format 0 or in a downlink control information format 4; or
the uplink indication field corresponds to an uplink index field in a downlink control information format 0 or in a downlink control information format 4.

13. The apparatus according to claim 10, wherein the most significant bit of the uplink indication field is used for indicating a first attribute of a first dynamic subframe and the least significant bit of the uplink indication field is used for indicating a second attribute of a second dynamic subframe.

14. The apparatus according to claim 10, wherein the uplink indication field is a field of 2 bits, and wherein the uplink indication field is divided into the most significant bit and the least significant bit.

* * * * *